United States Patent
Borneman et al.

[15] 3,706,240
[45] Dec. 19, 1972

[54] FOUR-SPEED RATIO AUTOMATIC POWER TRANSMISSION MECHANISM

[72] Inventors: Karl J. Borneman, Detroit; Richard E. Byler; Paul G. Roberts, both of Livonia; Stepas Smalinskas, Darmouth, all of Mich.

[73] Assignee: Ford Motor Company, Dearborn, Mich.

[22] Filed: June 17, 1971

[21] Appl. No.: 154,118

[52] U.S. Cl. .......................... 74/869, 74/864, 74/763
[51] Int. Cl. ......................... B60k 21/00, F16h 57/10
[58] Field of Search ............................. 74/869, 864

[56] References Cited

UNITED STATES PATENTS

| | | | |
|---|---|---|---|
| 2,932,990 | 4/1960 | Cartwright et al. | 74/869 X |
| 3,000,230 | 9/1961 | Froslie | 74/869 |
| 3,236,117 | 2/1966 | Christenson | 74/869 |
| 3,494,223 | 2/1970 | Mori | 74/688 |
| 3,656,373 | 4/1972 | Shimosaki | 74/869 |

*Primary Examiner*—Arthur T. McKeon
*Attorney*—John R. Faulkner et al.

[57] ABSTRACT

A planetary gear transmission mechanism for an automotive vehicle comprising two simple planetary gear units located in a first transmission housing portion, together with clutch and brake means for establishing three forward driving torque delivery paths with uniformly stepped ratios and a single reverse drive torque delivery path, a third simple planetary gear unit situated in a second transmission housing portion on the torque input side of the pair of gear units whereby each forward driving speed ratio established by the pair of gear units, as well as the reverse drive ratio, may be modified, and clutch and brake means in the second housing portion for controlling the motion of the elements of the third gear unit.

4 Claims, 6 Drawing Figures

United States Patent
Borneman et al.

INVENTORS:
Karl J. Borneman
Richard E. Byler
Paul G. Roberts
Stepas Smalinskas
ATTORNEYS.

FOUR-SPEED RATIO AUTOMATIC POWER TRANSMISSION MECHANISM

GENERAL DESCRIPTION OF THE INVENTION

Our invention relates generally to automotive transmission mechanisms of the type disclosed in co-pending application Ser. No. 883, 061, now U.S. Pat. No. 3,613,484 filed Dec. 8, 1969 by W. C. Winn and S. L. Pierce, Jr.

The transmission of the present invention is capable of providing four forward-driving speed ratios and a single reverse speed ratio using components that are common to the three-speed transmission of the Winn et al disclosure. This interchangeability is achieved by a novel combination of a simple planetary gear unit on the torque input side of the compounded gear units that establish three underdrive ratios and a reverse ratio. The simple planetary gear unit augments the torque ratio of the other gearing during underdrive operation and during reverse drive operation so that the reverse and low speed ratios are of a sufficient magnitude to make the transmission mechanism suitable for use in an automotive driveline. A fourth direct drive ratio is achieved by clutching together rotary elements of the simple planetary gear unit so that they rotate in unison. The ratio step that occurs during a ratio change between the third speed ratio and the direct drive ratio is relatively small thereby making the transmission mechanism suitable for use with a low-torque, high speed engine.

Provision is made in the transmission mechanism for controlling the operation of the clutch and brake structure for the third simple planetary gear unit during coasting operations to effect a downshift from the high speed ratio to the third-speed, underdrive ratio when the vehicle speed falls below a predetermined value such as 15 to 20 miles per hour. The control system includes also valve structure for timing the operation of the clutch and brake structure for the third gear unit during downshifts under torque from the high speed ratio to the low speed ratio to provide the proper clutch and brake operating sequence and to effect a smooth ratio transition. The control system includes a corresponding timing valve structure for controlling the timing of the clutch-and-brake engagement-and-release pattern during forward drive downshifts from the high speed ratio to the third underdrive ratio under open throttle conditions.

PARTICULAR DESCRIPTION OF THE INVENTION

Figure 1A:
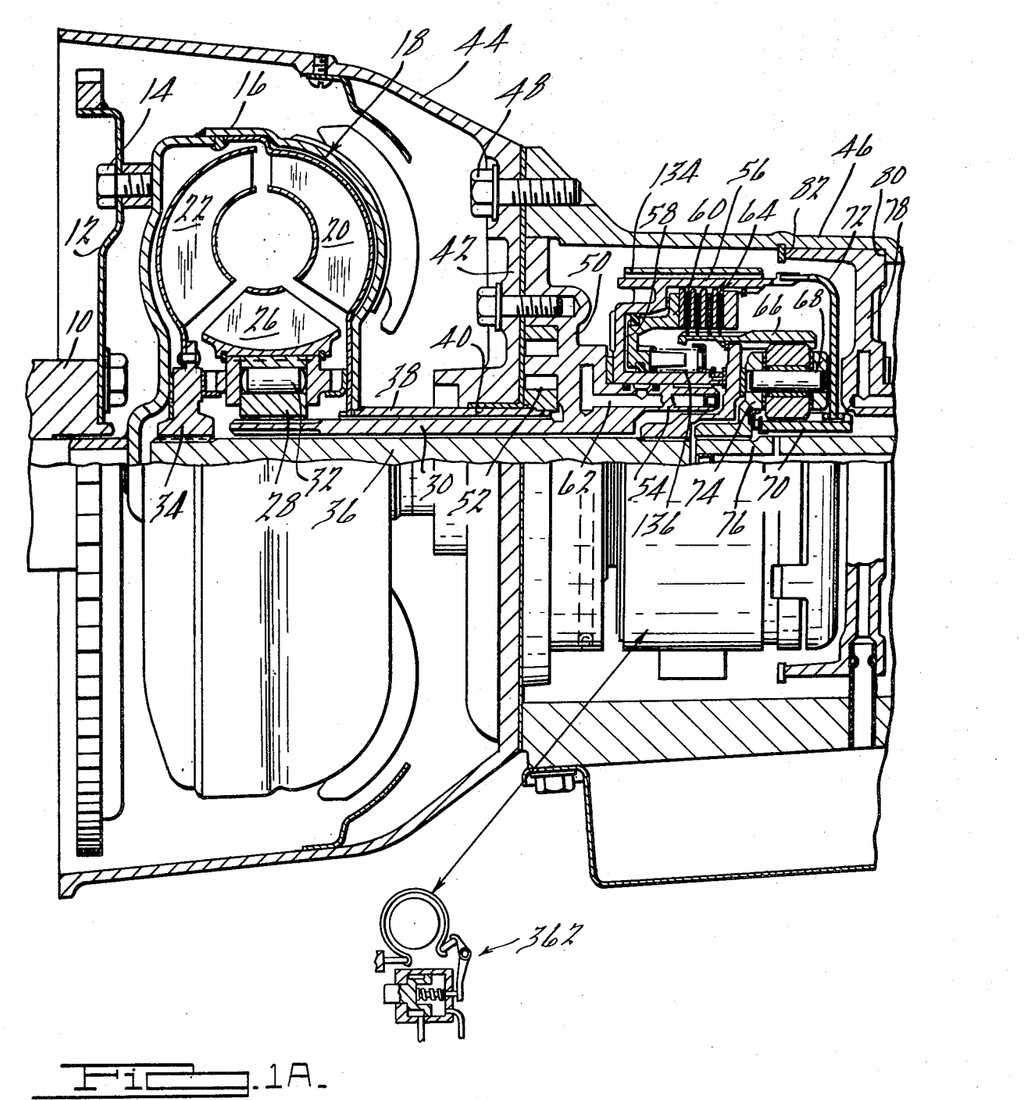
FIGS. 1A and 1B show, in cross sectional form, a four-speed power transmission mechanism embodying the improvements of our invention.

Numeral 10 in FIG. 1A designates one end of the crankshaft of an internal combustion engine, not shown. It is bolted to driveplate 12 which in turn is secured by bolts 14 to impeller shell 16 of hydrokinetic torque converter 18. Converter 18 has an impeller defined in part by shell 16 which carries impeller blades 20. These are arranged in toroidal fluid flow disposition with respect to bladed turbine 22 carried by turbine hub 34. Bladed stator 26 is situated between the flow exit region of turbine 22 and the flow entrance region of impeller blades 20.

Stator 26 is carried by hub 28 which is splined or otherwise secured to stator sleeve shaft 30. Overrunning brake 32 anchors stator 26 against rotation in one direction but permits freewheeling motion in the opposite direction.

Turbine hub 34 is splined to turbine shaft 36 extending through the stator sleeve shaft 30. The impeller shell is supported on impeller hub 38 which is journalled within bearing opening 40 in a transverse housing wall 42. This wall forms a part of a converter housing 44 which is secured to the engine block of the internal combustion engine.

Main transmission housing 46 is bolted by means of bolts 48 to converter housing 44. Pump housing 50 is bolted to wall 42 and is secured to or formed integrally with stator sleeve shaft 30. Housing 50 includes positive displacement pump gears 52. These form a positive displacement pump which supplies circuit pressure for the control system to be described with reference to FIGS. 2A through 2D. Bearing support 54 is formed on pump housing 50 and it provides a journal for brake drum 56. Brake drum 56 defines an annular cylinder 58 which receives annular piston 60. Fluid pressure is admitted to cylinder 58 through passage 62 formed in bearing support 54.

A multiple disc clutch assembly 64 is adapted to be applied by the piston 60 when pressure is admitted to the cylinder 58. This establishes a driving connection between the drum 56 and the ring gear 66 for a first planetary gear unit 68. Turbine shaft 36 is connected drivably to ring gear 66. Sun gear 70 for gear unit 68 is connected drivably to brake drum 56 through torque transfer member 72. Carrier 74 for gear unit 68 is splined directly to torque delivery shaft 76.

Transverse wall 78 is secured to the interior of housing 46 and is held axially fast by reaction shoulder 80 and snap ring 82.

Figure 1B:
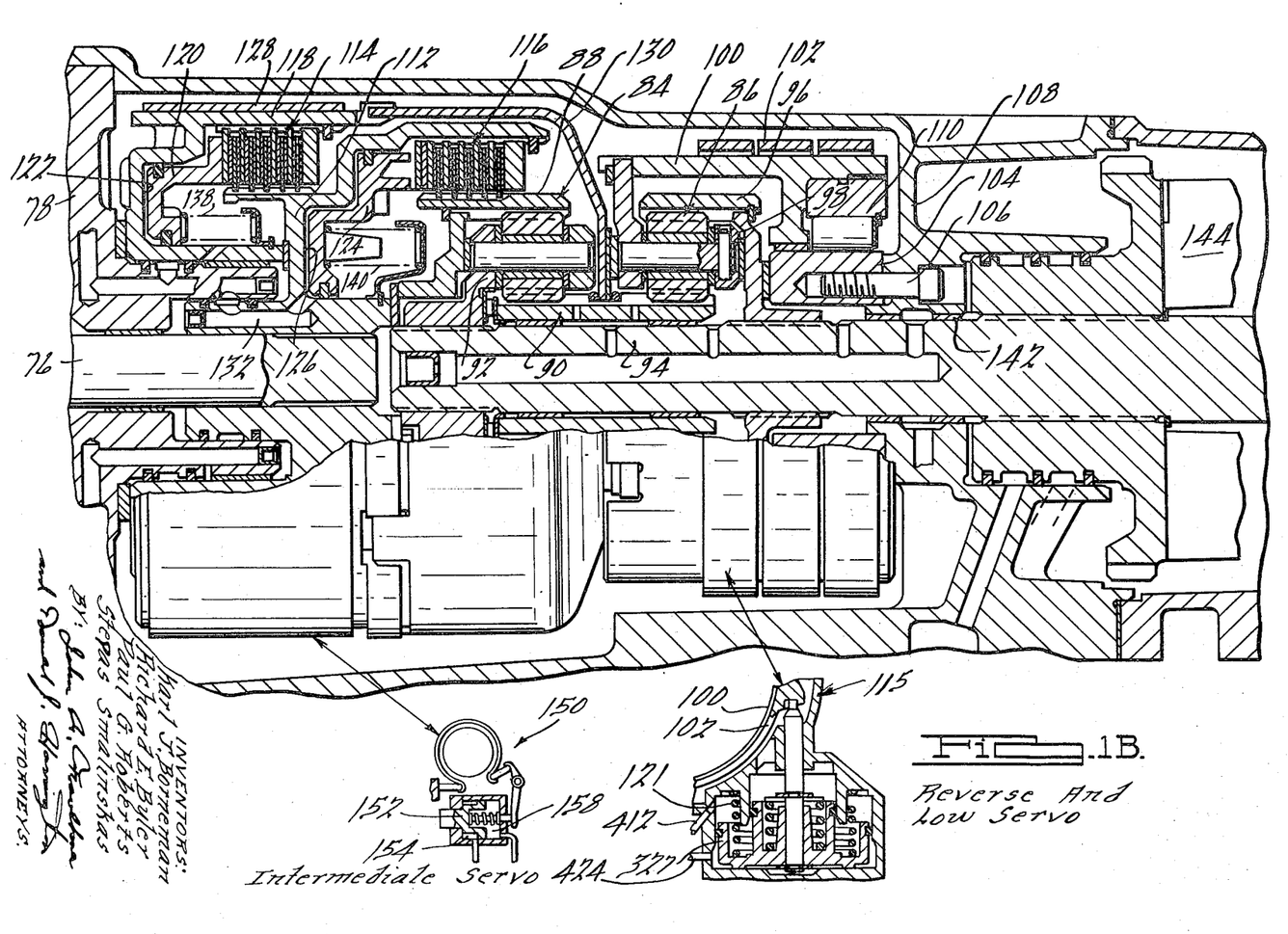

Housing 46 includes second and third simple planetary gear units 84 and 86. Gear unit 84 comprises ring gear 88, sun gear 90, carrier 92 and plant pinions journalled on the carrier 92 in meshing engagement with ring gear 88 and sun gear 90. Carrier 92 is splined directly to power output shaft 94.

Gear unit 86 includes ring gear 96, carrier 98 and sun gear 90, the latter being common to the gear unit 84. Carrier 98 is drivably connected to brake drum 100 about which is positioned brake band 102. Carrier 98 journals planet pinions that mesh with sun gear 90 and ring gear 96.

Brake drum 100 is journaled on and adapted to be anchored to stationary inner brake race 104, which is bolted by bolts 106 to the rear transmission wall 108. This wall forms a part of housing 46. Overrunning brake elements 110 are located between an outer race carried by drum 100 and race 104 to inhibit rotation of brake 100 in one direction while permitting free-wheeling motion thereof in the opposite direction. Brake 102 prevents rotation of brake drum 100 in the free-wheeling direction when applied.

Torque delivery shaft 76 is splined to clutch cylinder member 112 which carries discs for multiple disc clutch 114 as well as discs for multiple disc clutch 116. Discs carried by ring gear 88 cooperate with the discs carried by member 112 to form a frictional driving connection between the member 112 and the ring gear 88. Similarly, clutch 114 has discs carried by member 112 and by brake drum 118. These are urged into frictional engagement by piston 120 which is received in the inner cylinder 122 formed in the drum 118. The clutch discs of clutch 116 are moved into clutching engagement by piston 124 received in annular cylinder 126 formed in the member 112.

Brake band 128 surrounds the drum 118 to anchor sun gear 90. Drum 118 is connected to sun gear 90 through torque transfer member 130. Fluid pressure is admitted to the cylinder 126 through passage 132.

During operation in each underdrive ratio, as well as during reverse drive, sun gear 70 is anchored by brake band 134. Brake band 134 and brake band 128 are actuated and released by fluid pressure operated servos. The fluid pressure operated clutches are released by clutch springs. The clutch release spring for clutch 64 is shown at 136, the clutch release spring for clutch 114 is shown at 138 and the clutch release spring for clutch 116 is shown at 140.

Power output shaft 94 is journalled in bearing opening 142 formed in the end wall 108. A governor valve assembly 144 is fixed to the shaft 94.

Clutch 116 is applied during operation in each forward driving ratio. To establish low speed ratio operation, brake 134 is applied and clutch 116 is applied. Carrier 74 acts as a torque output element for the gear unit 68. The sun gear 70 acts as a reaction point. Gear unit 68 multiplies the turbine torque on shaft 36. The multiplied torque is distributed to ring gear 88 through the clutch 116. Shaft 94, which is the power output shaft, resists forward driving motion thereby causing reaction torque on sun gear 90 to be distributed through the gear unit 86. This imparts a forward driving torque to the ring gear 96 which torque is delivered to the output shaft 94 as the carrier 98 acts as a reaction member. This complements the torque delivered to shaft 94 by carrier 92. The reaction torque on the carrier 98 is distributed to the stationary housing through overrunning brake 110. If continuous operation in the low speed ratio is desired, brake band 102 may be applied thereby anchoring the brake drum 100 and the carrier 98. The carrier 98 then can accommodate reaction torque in either direction.

To accomplish a ratio change from the low speed ratio to the second underdrive ratio, sun gear 90 is anchored by applying brake band 128 as brake 134 and clutch 116 remain applied. Gear unit 68 then continues to multiply the turbine torque on shaft 36. This multiplied torque is distributed through the engaged clutch 116 to the ring gear 84. The sun gear 90 acts as the reaction point as the carrier 92 distributes torque to the output shaft 94. Overrunning brake 110 freewheels under these conditions thereby rendering the gear unit 86 inactive.

The third underdrive ratio is obtained by releasing the brake 128 and applying clutch 114 as the clutch 116 and the brake band 134 remain applied. Gear units 84 and 86 now become locked together as their elements rotate in unison.

The fourth forward-driving speed ratio is obtained by releasing brake band 134 and applying clutch 64 while clutches 114 and 116 remain applied and brake bands 128 and 102 remain released. Clutch 64 now locks together the elements of gear unit 68 so that the overall speed ratio for the geared portion of the transmission mechanism is 1:1.

Reverse drive is obtained by applying clutch 114 and brake 102. Brake band 134 also is applied thereby causing gear unit 68 to multiply the turbine torque for shaft 36. The output torque of the gear unit 68 is transmitted through the engaged clutch 114 to the sun gear 90 thereby causing ring gear 96 to rotate in a direction opposite to the direction of rotation of the turbine shaft 36. As the carrier 98 acts as a reaction point, the motion of the ring gear 96 is transmitted directly to the output shaft 94.

The control circuit elements that control the mode of operation of the clutch and brake structure of FIGS. 1A and 1B is illustrated in FIGS. 2A through 2D. The control circuitry includes manual valve 300 which comprises a valve spool 302 having spaced valve lands 304, 306, 308, 310 and 312. A central opening 314 is formed in the valve spool 302 and the lands of the valve spool 302 register with cooperating internal valve lands formed in valve chamber 316. Manual valve 302 may be adjusted to any one of six operating positions which have been identified by reference symbols R, N, D, 3, 2 and 1.

Figure 2A:
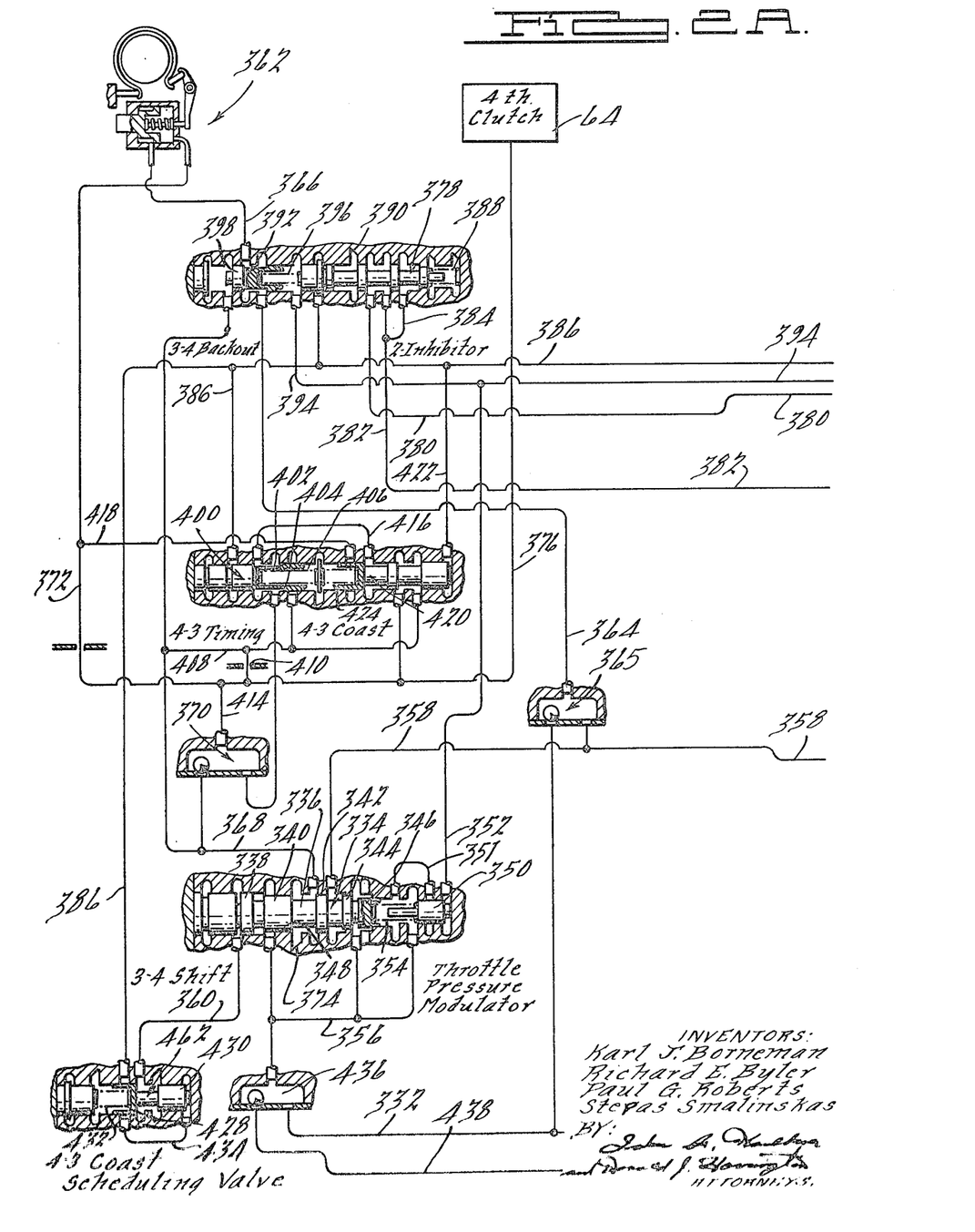
FIGS. 2A, 2B, 2C and 2D each show separate parts of an automatic control valve system for controlling ratio changes in the transmission structure of FIGS. 1A and 1B.
Figure 2B:
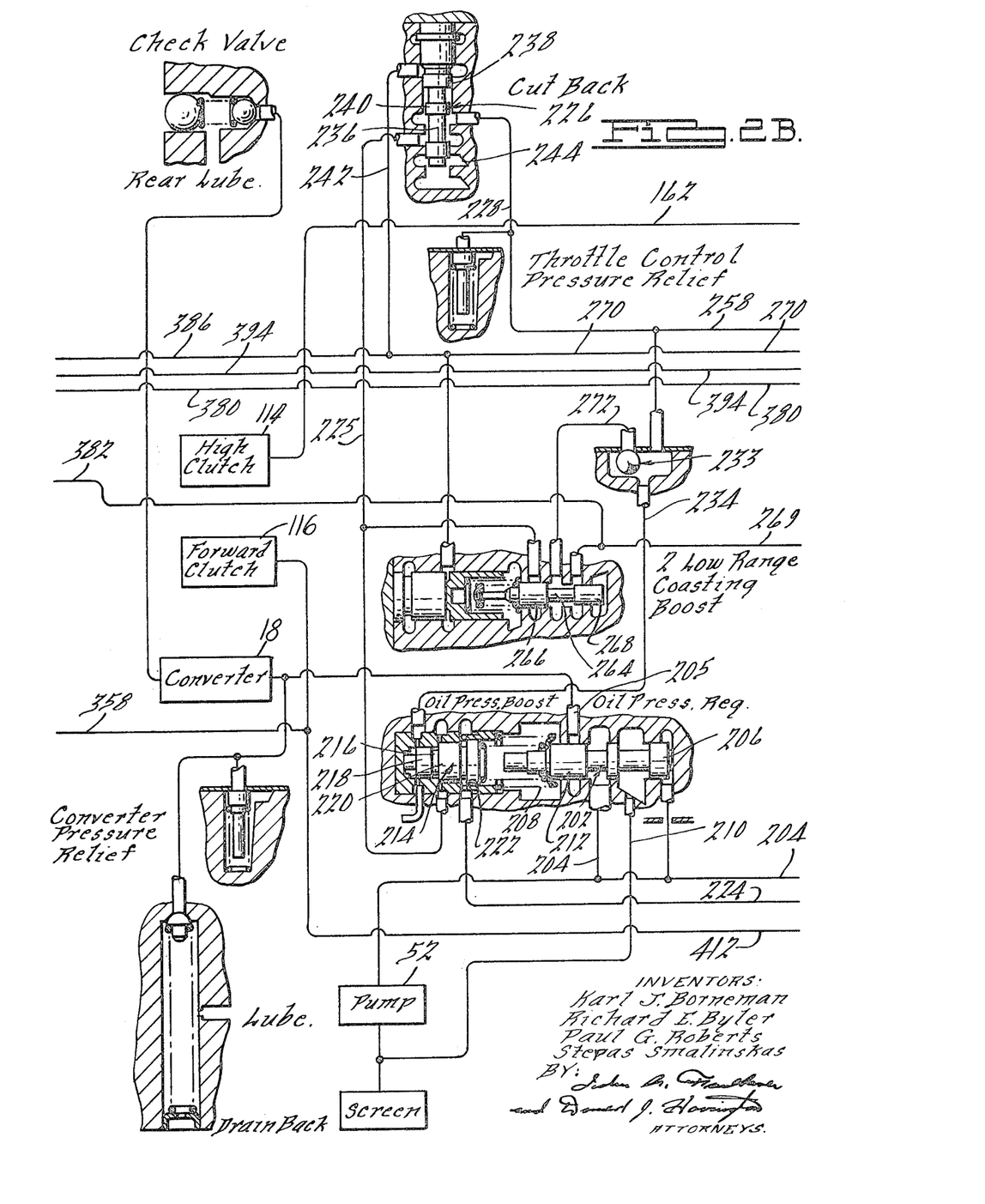
Figure 2C:
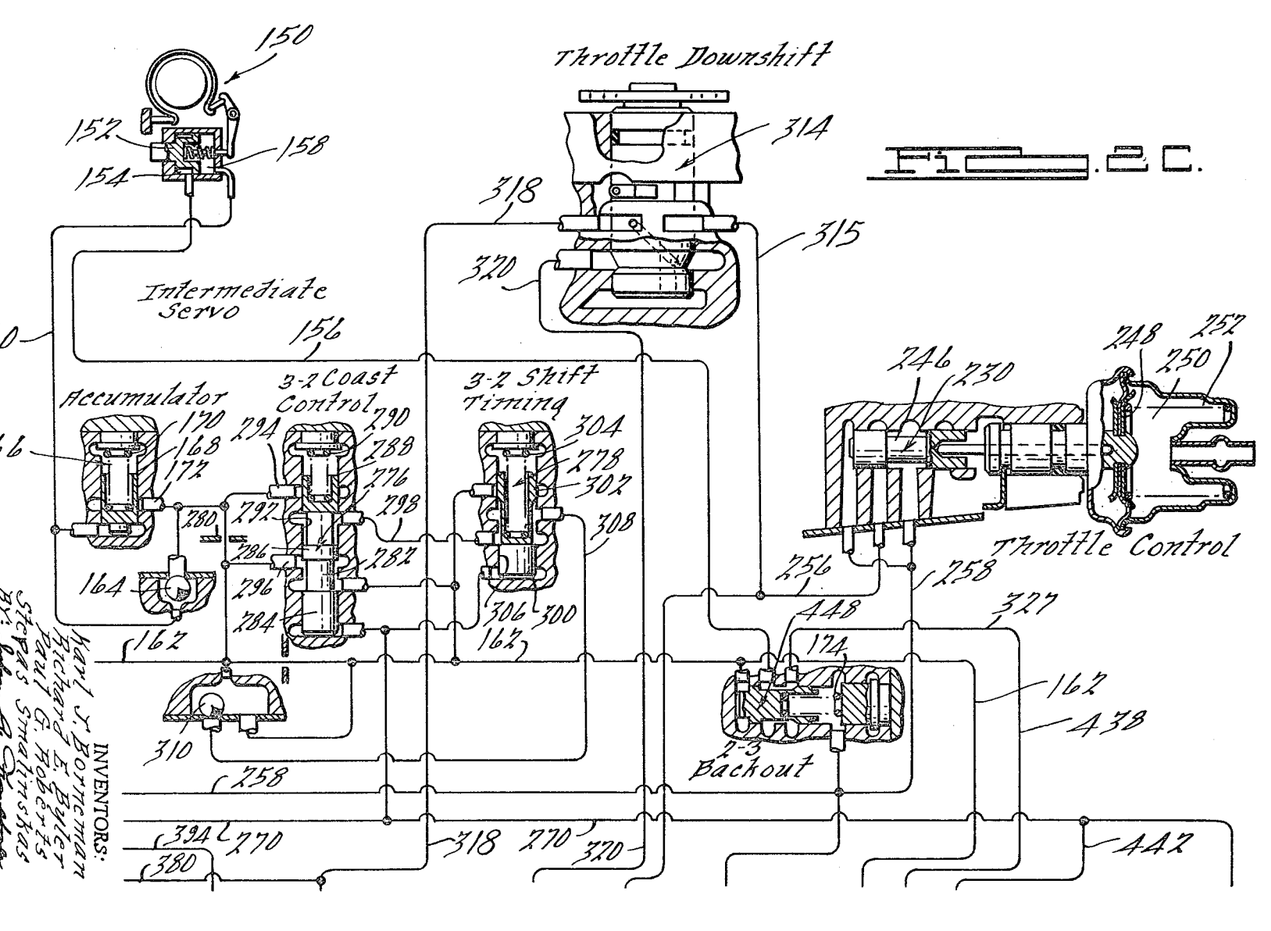
Figure 2D:
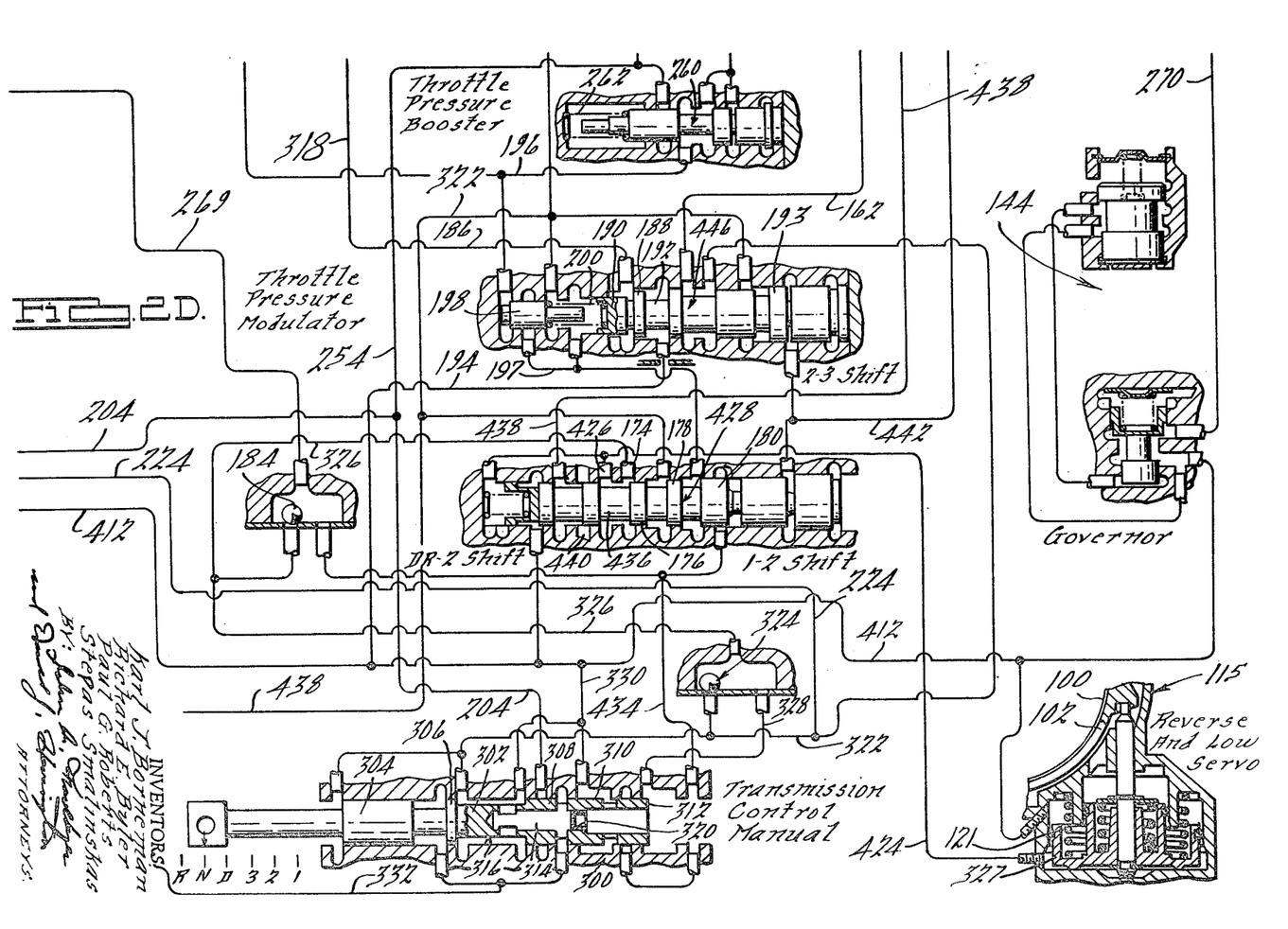

The annular groove between lands 306 and 308 communicates with the opening 314 through a radial passage. Similarly, the annular groove between lands 308 and 310 communicates with the opening 314. A plug 320 separates the opening 314 into two parts, the part on the right hand side thereof communicating with the exhaust region and with the annular groove between lands 312 and 310.

FIG. 2D shows the manual valve 300 in the "N" position. The symbols correspond respectively to reverse drive, neutral, automatic forward drive range, third speed ratio underdrive, second speed ratio underdrive and first speed ratio underdrive. When manual valve spool 302 is in the D position, automatic ratio changes during forward drive operation are obtained automatically in response to changing engine manifold pressure and vehicle speed. When the manual valve assumes the "3" position, automatic ratio changes occur from low through third underdrive ratio in response to changing engine manifold pressure and vehicle speed. When the manual valve element assumes the "2" position, the transmission mechanism is conditioned for continuous operation in the second underdrive ratio. When the manual valve element assumes the "1" position, the transmission mechanism is conditioned for continuous underdrive operation in the lowest speed ratio.

When manual valve spool 302 assumes the neutral position, as shown in FIG. 2D, all of the passages communicating with the chamber 316, with the exception of passage 204, are exhausted. Passage 204 is blocked by valve land 308.

Pressure is distributed continuously when spool 302 is in any forward drive position to passage 412, which extends to the low-and-reverse brake servo 115. A pressure chamber of relatively large volume is formed on one side of compound piston 327 for servo 115. This tends to move piston 327 against the opposing force of valve spring 121 to effect braking engagement of brake band 102.

Servo 115 includes also a relatively small fluid pressure chamber, which is in fluid communication with passage 412. Passage 424, which communicates with the larger servo chamber, extends to port 426 of 1-2 shift valve assembly 428, the operation of which will be described subsequently.

Manual valve chamber 316 communicates through either axial end thereof with the exhaust region when spool 302 is in neutral position.

Passage 322, which also communicates with valve chamber 316, is pressurized whenever manual valve spool 302 assumes the "R" position. It is exhausted at other times through the left hand end of valve chamber 316. Passage 326 also communicates with valve chamber 316 via ball valve 324 and is pressurized whenever the manual valve assumes the "1" position or the reverse position "R".

Passage 434, which communicates with the valve chamber 316, is pressurized whenever manual valve spool 302 assumes the "2" position. It is exhausted at other times.

Passage 330, which is connected to passage 412, is pressurized whenever the manual valve assumes any forward drive position. It communicates directly with the forward drive clutch 116.

Ratio changes between the low speed ratio and the intermediate speed ratio are controlled by 1-2 shift valve assembly 428. This includes valve spool 436, which exhausts passage 438 through exhaust port 440 when it assumes the position shown. Governor pressure in passage 442 acts upon the right hand end of the valve spool 436 thereby tending normally to urge it in a left hand direction. When it assumes a left hand position, spool 436 will cause distribution of pressure from passage 412 to passage 438 and passage 424 at the same time is exhausted through port 440.

Governor pressure in passage 442 is developed by a compound governor valve assembly 144 which is connected drivably to tailshaft 94, as indicated in FIG. 1B. The same governor pressure signal in passage 442 acts upon the right hand end of 2-3 shift assembly 446, which will be described subsequently.

When passage 438 is connected to passage 412 through the 1-2 shift valve assembly, pressure is distributed through 2-3 backout valve assembly 448 to the apply side of intermediate servo 150. This servo includes piston 152 having a pressure chamber on either side thereof. The pressure chamber corresponding to the apply side of the servo is identified by reference character 154. It is connected to passage 438 and 2-3 backout valve 448 through passage 156. Release pressure chamber 158 is formed on the opposite side of piston 152, and it communicates through passage 160 with passage 162. A one-way check valve 164 is located in the passage 160 to permit distribution of pressurized fluid from passage 162 to the passage 160 but preventing fluid pressure distribution in the opposite direction.

When both pressure chambers 158 and 154 are pressurized, piston 152 is stroked to the brake release position since chamber 158 has a larger effective pressure area. When distribution of pressure to chamber 158 is interrupted, the piston will stroke to the brake apply position under the influence of pressure in chamber 154. This requires displacement of the fluid that exists in chamber 158. The displaced fluid is transferred through accumulator valve 166. This valve includes single diameter valve element 168, which is biased under the influence of valve spring 170 to the position shown in FIG. 2C. When it assumes that position, communication between passage 160 and valve port 172 is interrupted. Valve port 172 communicates directly with the passage 162. Passage 160 and port 172 are located at spaced locations in the valve chamber within which valve element 168 is situated.

The presence of accumulator valve 166 in the exhaust flow circuit for the release side of the intermediate servo provides an accumulator effect which modifies the rate of brake application.

When 1-2 shift valve assembly 428 is shifted in a left hand direction during an upshift from the low speed ratio to the intermediate speed ratio, exhaust port 440 is brought into communication with passage 424 which extends to the larger low-and-reverse servo pressure chamber. If the low-and-reverse servo brake 102 is applied immediately prior to a ratio change to the intermediate speed ratio position, it now becomes released.

If the manual valve should be shifted to either the low or reverse positions, passages 326 and 328 become pressurized. Passage 326 communicates directly with port 174. When 1-2 shift valve element 436 is in the position shown in FIG. 2D, communication is established through the 1-2 shift valve chamber with port 426 and passage 424. Passage 424 communicates also with the spring chamber located on the left side of valve element 436 so that when the manual valve element is in the L or R positions, the 1-2 shift valve assembly is locked in its low speed or right hand position. An upshift from the low speed ratio to the intermediate speed ratio then cannot be effected regardless of changes in governor pressure. If the manual valve should be shifted to the low speed ratio position when the vehicle is operating at a relatively high speed, the governor pressure will be sufficient to overcome the opposing influence of control pressure in passage 326 acting on the differential area of lands 176 and 178. The left hand side of valve element 436 will be exhausted through port 440 under these conditions. As soon as the vehicle speed is reduced to a coasting downshift point that is predetermined, valve element 436 will shift in a right hand direction and pressure then will be distributed to the left side of valve element 436, as explained previously, thereby locking the 1-2 shift vaLve assembly in its low speed ratio position.

If the manual valve should be shifted to the "2" position, pressure is made available to passage 434 as explained previously. This pressure is distributed to the right hand end of valve land 180 on valve spool 436 thereby shifting valve spool 436 in a left hand or upshift position. It is held in that position irrespective of changes in governor pressure in passage 442. Pressure is distributed also from passage 434 through the 2-way check valve 184 to passage 186, which extends to a differential area defined by valve lands 188 and 190 on the valve spool 192 for the 2-3 shift valve assembly 446. Governor pressure is distributed to the right hand side of land 193 through passage 442.

When valve spool 192 is in the position shown in FIG. 2D, communication between passage 162 and passage 194 is interrupted. Passage 194 communicates directly with control pressure passage 412.

A throttle pressure signal, which is an indicator of engine torque, is distributed through passage 196 to one side of throttle pressure modulator valve 198. A valve spring 200 is located between the valve 198 and the spool 192 so that the pressure in passage 197 is modified. This modified pressure is distributed to the left hand side of land 190 and to the differential area defined by lands 178 and 180 on the 1–2 shift valve assembly.

When the 2–3 shift valve assembly 446 moves to the upshift position, communication is established between passage 194 and passage 162 extending to the high speed clutch. Whenever the 2–3 shift valve assembly 446 is forced to assume the position shown in FIG. 2D, upshifts to the third speed ratio are prevented.

The effective control pressure made available to the circuit through passage 204 is regulated by the oil pressure regulator valve 202. This includes passage 204 extending to the discharge side of pump 52 and an outlet bypass flow passage 205 extending to the relatively low pressure lubrication circuit and the feed passage for the hydrokinetic torque converter 18.

Regulator valve 202 includes a valve spool having a land 206 which communicates at its right hand side with passage 204. A valve spring 208 opposes the force of the pressure on land 206. Bypass flow passage 210 communicates with the regulator valve 202 and conducts bypass fluid back to the inlet side of the pump 52.

The degree of communication between passage 204 and passage 205 is regulated by valve land 212 so that converter pressure is maintained in the torque converter circuit.

Pressure booster valve 214 is located at the base of regulator valve assembly 202. It includes multiple land spool 216 having spaced lands 218, 220 and 222. The differential area defined by lands 220 and 222 is in fluid communication with passage 224, which communicates with the reverse pressure passage 322. This passage extends through the 2–3 shift valve assembly and it communicates with passage 162 when the 2–3 shift valve assembly is in the position shown in FIG. 2D. Thus, the clutch 114 is engaged during reverse drive operation. At the same time, passage 326, which is pressurized when the manual valve assumes the low or reverse positions, communicates with passage 424 through the 1–2 shift valve assembly when the latter assumes the position shown in FIG. 2D. This engages the low-and-reverse servo.

Since the reaction torque during reverse drive is higher than it is during operation in the forward drive range, it is necessary to augment the circuit pressure to enable the clutch and the brake to satisfy the torque transmitting requirements. This pressure boost is achieved by the oil pressure boost valve assembly 214. The pressure in passage 224 acts upon the spool 216 and supplements the force of the spring 208 thereby causing higher circuit pressure to be regulated by the main oil pressure regulator valve 202. The magnitude of the circuit pressure is sensitive also to changes in a pressure signal in passage 225 which is determined by the magnitude of the intake manifold pressure of the vehicle engine. This pressure signal acts on the differential area of lands 218 and 220. The signal in passage 225 is distributed to it through the cutback valve 226 which establishes selectively a connection between passage 225 and passage 228 extending to passage 258 and thence to primary throttle valve assembly 230. The same pressure signal from the throttle valve assembly 230 is distributed also through three-way check valve 233 to passage 234, which extends to the left hand side of the land 218 on the oil pressure booster.

The Cutback valve includes multiple lands located on valve spool 236. When the valve spool 236 is positioned as shown, communication is established between passages 228 and 225 through the cutback valve. The pressure signal in passage 228 acts on the differential area of lands 238 and 240 to normally urge the valve spool to the position shown in FIG. 2B. This force is opposed by governor pressure acting on the upper end of land 238. Governor pressure is distributed to the cutback valve through governor pressure passages 242 and 270, the latter extending to governor valve assembly 144. After the vehicle reaches a predetermined speed during acceleration from a standing start, cutback valve spool 236 is moved downwardly thereby exhausting the pressure in passage 225 through exhaust port 244. This reduces the net pressure force acting on the pressure regulator valve thereby causing a cutback in the regulated line pressure.

A throttle pressure signal that is proportional in magnitude to engine manifold pressure is developed by throttle valve assembly 230, which includes a spool valve element 246. This is connected mechanically to the flexible diaphragm 248 which defines in part a pressure cavity 250 connected to the engine manifold. Diaphragm 248 is urged normally in a left hand direction by valve spring 252.

Valve element 246 is located in a valve chamber which is in direct communication with the control pressure passage 204 through passage 254 and passage 256. Valve element 246 modulates the pressure in passage 256 to produce a reduced pressure in passage 258, which is proportional to the magnitude of the pressure in the chamber 250.

The pressure signal in passage 258 is distributed directly to throttle pressure booster valve 260, which communicates with passage 254. Valve spring 262 normally maintains the valve 260 in the position shown in FIG. 2D thereby establishing a direct connection between passage 258 and passage 196. When the engine intake manifold pressure is at an intermediate value, valve 260 is moved in a left hand direction thereby establishing controlled communication between line pressure passage 254 and passage 196 as communication is restricted between passage 196 and passage 258.

The modified throttle pressure signal in passage 196 in turn is distributed to the throttle pressure modulator valve element 198, the output from which is distributed to both the 2–3 shift valve and the 1–2 shift valve as explained previously. The shift point then can be established by appropriately calibrating valve 198 without interfering with the pressure signal delivered from throttle valve assembly 230 directly to the oil pressure booster 214.

Augmentation of the circuit pressure during coasting operation in the second speed ratio can be achieved by the "2-low range" coasting boost valve assembly 264. This comprises a valve spool having differential valve lands 266 and 268. Control pressure from passage 269 is distributed to the differential area of valve assembly 164. Passage 269 communicates with passage 326 through three-way check valve 184. It communicates also with passage 434 through the same valve when the manual valve is shifted to the "2" position. Thus, control pressure is made available to passage 269 when the low and reverse range positions of the manual valve are selected as well as when the second speed ratio position is selected. Governor pressure acts on the left hand side of valve assembly 264 and is distributed to it through governor pressure passage 270 which communicates directly with previously described governor pressure passage 442.

When the vehicle is coasting as high speeds, the engine braking torque is relatively high and the throttle pressure, since coasting occurs with a relaxed throttle, tends to become reduced. In order to permit the clutch and brake torque transmitting capacity to remain high enough to accommodate the coasting torque braking, the governor pressure acting on valve assembly 264 will cause valve assembly 264 to modulate the pressure in passage 269 to produce an augmented pressure in passage 272, which is distributed through three-way check valve 233 to passage 234 thereby resulting in an augmentation in the net pressure forces acting on the oil pressure booster. The magnitude of the coasting boost effect will decrease as the vehicle coasting speed decreases.

As explained previously, high speed ratio operation is achieved as high clutch 114 becomes applied. Feed passage 162 for high clutch 114 acts also as a feed passage for the release side of the intermediate servo. Passages 160 and 162 are connected, as explained previously, by one-way check valve 164 during an upshift from the intermediate ratio to the high speed ratio. The same passages are connected on a downshift through accumulator valve 166.

To effect a downshift from the high speed ratio to the intermediate speed ratio, it is necessary for high clutch 114 to become released as the intermediate servo becomes applied. It is necessary, therefore, for the release side of the intermediate servo and the high speed clutch to be exhausted through passage 162 and through the 2-3 shift valve assembly 446. The latter establishes communication between passage 162 and passage 322, which communicates with the exhaust region during forward drive operation.

It is desirable, when such a shift occurs under zero torque conditions, for the intermediate servo to become released with a cushioning action because the reaction torque acting on the intermediate brake is slight at that time. This cushioning action is achieved by 2-3 backout valve 448. Normally the 2-3 backout valve 448 is urged to the position shown in FIG. 2C by throttle pressure in passage 258 and by the action of the valve spring 174. Therefore, during a 2-3 upshift with relaxed throttle, valve 448 will be shifted in a right hand direction thereby establishing communication between the apply side of the intermediate servo and high clutch 114. The intermediate servo then acts as an accumulator for the high clutch thereby delaying the disengagement of the high clutch and cushioning the application of the intermediate brake. After the shift is accomplished, the pressure acting on the left hand side of valve 448 will have decayed sufficiently to permit valve spring 174 to urge valve 448 into the position shown in FIG. 2C.

When a 3-2 coasting downshift occurs at speeds less than 20 m.p.h., the rate of application of the intermediate speed ratio brake is controlled by 3-2 coast control valve 276. When a torque demand downshift occurs from the high speed ratio to the intermediate speed ratio in response to an engine torque demand by the vehicle operator at speeds greater than 50 m.p.h., the downshift is controlled by 3-2 shift timing valve 278. Under both downshift conditions, however, the rate of application of the servo is controlled by a control orifice indicated by reference numeral 280 which is situated in the fluid flow path for the fluid displaced from the release side of the intermediate servo through passage 160.

The 3-2 coast control valve 276 comprises a multiple land valve spool 282 having spaced valve lands 284, 286 and 288. Spool 282 is urged normally in a downward direction, as viewed in FIG. 2C, by valve spring 290. Valve chamber 292, which receives spool 282, registers with the valve lands on spool 282 thereby establishing controlled communication between the release side of the intermediate servo and passage 162. Port 294 in the chamber 292 communicates with the upstream side of the orifice 280 and port 296 communicates with the downstream side of the orifice 280.

Valve element 282 is subjected to governor pressure which is distributed to the lower end of the land 284 through passage 270. When the vehicle operates at relatively low speeds, such as speeds less than 20 m.p.h., the pressure in passage 270 is insufficient to overcome the force of the spring 290 and the valve element 282 assumes the position shown in FIG. 2C. At that time, port 294 becomes blocked by land 288 and port 296 is opened so that it communicates with passage 162. During a coasting 3-2 downshift at low speeds it therefore is necessary for the fluid on the release side of the intermediate servo to be displaced through the orifice 280 as it flows through the passage 162 and through the 2-3 shift valve 446 to the exhausted passage 332. This delays the application of the intermediate servo following release of the high speed ratio clutch 114. The orifice 280 does not delay the release of the high clutch 114. The rotary elements that are connected to the torque output side of the clutch 114 then have time to decelerate before the application of the brake, thus reducing the inertia force experienced as the brake becomes applied. When the vehicle is operated at speeds greater than the predetermined threshold value, which may be 20 m.p.h. as mentioned earlier, the valve element 282 is moved upwardly against the force of spring 290 thereby blocking communication between port 296 and passage 162 and opening port 294 so that it communicates with passage 298 extending to the 3-2 shift timing valve.

Valve 278 comprises a valve spool having spaced valve lands 300 and 302. It is urged in a downward direction as indicated in FIG. 2C by valve spring 304. When it assumes the position shown in FIG. 2C, communication is established through valve chamber 306 between passage 298 and passage 308, the latter communicating with passage 162 through three-way check valve 310. When a downshift occurs under these conditions, the fluid displaced from the release side of the intermediate servo is transferred directly through the 3-2 coast control valve 276 without passing through the orifice 280. The fluid then passes directly from passage 298 to passage 162 without further flow restriction. Such a downshift occurs during normal automatic speed ratio changes while the vehicle is operating under torque. These ratio changes occur in response to shifting movement of the 2-3 shift valve as explained previously. The brake application delay that is desirable during a 3-2 coasting downshift is not desirable during downshifts under torque because a controlled degree of overlap in the clutch release and the brake application is desired in this instance.

If a forced downshift from the high speed ratio to the low speed ratio occurs at a relatively high speed (for example, at vehicle speeds greater than 50 m.p.h.), it is desirable to introduce a controlled delay in the application of the intermediate servo in order to allow the engine sufficient time to accelerate from its given speed to the higher speed necessary for operation in the intermediate ratio. This shift timing is achieved by the 3-2 shift timing valve 278. At vehicle speeds greater than 50 m.p.h., the governor pressure is sufficient to create a force on the lower end of the land 300 to move the valve 278 against the force of spring 304 thereby blocking passage 298 and interrupting the exhaust flow path to the passage 308. Under these conditions, the orifice 280 provides the only fluid flow path for the oil displaced from the release side of the intermediate servo.

If the vehicle is operated at a speed less than the predetermined value of 50 m.p.h., the valve 278 will assume the position shown in FIG. 2C thereby directly connecting passage 298 and passage 308 permitting the fluid displaced from the release side of the intermediate servo to bypass the orifice 280. This permits a more rapid application of the intermediate brake band. The shift timing requirements for such 3-2 downshifts under torque at high speeds can be achieved by appropriately calibrating the valve 278 without reference to the 3-2 downshift timing requirements during a downshift at relaxed throttle at low speeds. The latter downshift as mentioned earlier is controlled by independently calibrating the 3-2 coast control valve 276.

The accumulator 166 is introduced into the fluid flow path for the oil on the release side of the intermediate servo during each type of downshift. The accumulator is calibrated to produce a desired back pressure compatible with the downshift timing requirements during ratio changes from the high speed ratio to the intermediate speed ratio under each of the driving conditions.

A forced downshift valve, which will overrule the automatic operation of the shift valves, is identified generally by reference character 314. Fluid pressure from the pump 52 is supplied to passage 315 from passage 256 and connecting passages 254 and 204. Passage 315 extends to the inlet side of the valve 314. Valve 314 is controlled by the engine carburetor throttle linkage. When it is moved to a downshift position, valve 314 will establish a connection between passage 315 and passage 318, which extends to the kickdown pressure passage 186 for the 2-3 shift valve. It distributes pressure also to passage 320 which extends to passage 322 which communicates with the left hand end of the 2-3 shift valve assembly, the differential area provided by land 193 on the 2-3 shift valve spool, and to the differential area on the 1-2 shift valve spool defined by lands 176 and 178. Thus, a forced downshift can be achieved from the high speed ratio to the low speed ratio only when the vehicle speed is sufficiently low to permit the shift to occur.

Passage 322 is pressurized whenever the manual valve is shifted to the "R" position which corresponds to reverse drive. Three-way check valve 324 establishes communication between passage 322 and the 1-2 shift valve feed passage 326.

When the manual valve is shifted to the "1" position, valve 324 connects passage 328 with passage 326.

When the manual valve is shifted to the "1" position, valve 324 connects passage 328 with passage 326.

Passage 330 is pressurized whenever the manual valve is shifted to one of the forward drive positions "D", "3", "2", or "1". Passage 332 is pressurized whenever the manual valve is shifted to the positions "R", "3", "2" or "1".

Ratio changes between the third speed ratio and the fourth direct-drive ratio are controlled by 3-4 shift valve 334. This includes valve spool 336 with its spaced lands 338, 340, 342, 344 and 346. These lands register with internal lands formed in 3-4 shift valve chamber 348.

Throttle pressure is distributed to throttle pressure modulator valve 350 through passage 352. The output pressure of the modulator valve 350 is distributed to the right hand end of the land 346 through passage 351, thereby exerting a downshifting force on the valve spool 336 which complements the force of valve spring 354.

During automatic drive range operation, control pressure is distributed to the shift valve chamber 348 through passage 358 which communicates with the passages 412 and 330. Governor pressure from passage 270 is distributed to the left hand side of the valve land 338 through passage 360 thereby producing a force that opposes the forces of the throttle pressure and the valve spring.

During operation of the mechanism, control pressure is distributed to the apply side of the brake servo 362 through passages 366, 364 and 358, the latter being connected to passage 412 and 330. Communication is established between pressurized passage 332 and passage 364 through two-way check valve 365. The release side of the servo 362 communicates with passage 368 through two-way check valve 370 and passage 372.

When the shift valve spool 336 is positioned in the downshift position shown, passage 368 is open to the exhaust port 374. When the valve spool 336 is shifted to the upshift position in a right hand direction, communication is established between passage 368 and passage 358 thereby pressurizing the release side of the servo 362 and releasing the brake. At the same time pressure is distributed to passage 376. Passage 376 in turn communicates with the direct drive clutch chamber 58 for the clutch 64. Thus, when the valve spool 336 is moved to the upshift position, both the release side of the servo 362 and the clutch 64 become pressurized thereby releasing the brake and applying the clutch.

An inhibitor valve 378 is situated in the downshift pressure passage 380 that communicates with passage 318 extending from the throttle downshift valve 314. Control pressure received from the check valve 184 is distributed to the inhibitor valve 378 through passage 382. Valve 378 provides fluid communication between passage 382 and passage 380 extending to the downshift valve 314 when the valve 378 assumes the position shown. Feedback pressure passage 384 causes the valve 378 to be locked into the position shown in FIG. 2A after the transmission is conditioned for second speed ratio operation.

Governor pressure is distributed to the left hand side of valve 378 through passage 386. This opposes the effect of valve spring 388. If the governor pressure is sufficiently high during operation and the manual valve is moved to the "2" position, pressure in passage 382 is prevented from being distributed to passage 380, the latter being exhausted through port 390. Thus, a downshift is prevented thereby avoiding undue inertia forces that otherwise would exist if the transmission is downshifted to the second speed ratio when the vehicle speed is too high.

Minimum or zero throttle upshifts from the third speed ratio to the fourth speed ratio are controlled by 3-4 backout valve assembly 392. Throttle pressure is distributed to the right hand end of the 3-4 backout valve 392 through throttle pressure passage 394. This throttle pressure supplements the force of spring 396.

Backout valve 392 includes valve land 398, which establishes controlled communication between passage 368 and passage 366. If a relaxed throttle upshift occurs, passage 368 becomes pressurized. This causes valve 392 to be shifted in a right hand direction thereby providing controlled communication between the apply side of servo 362 and clutch 64. The servo then acts as a temporary accumulator for the clutch as clutch capacity gradually increases. This increase occurs simultaneously with the servo capacity decrease.

During a downshift from the fourth speed ratio to the third speed ratio the timing between disengagement of clutch 64 and the application of servo 362 is controlled by the 4-3 timing valve 400. This comprises a double land valve spool 402 situated in valve chamber 404. Spool 402 is urged in a left hand direction by valve spring 406. If the transmission throttle pressure is increased to force a downshift from the fourth ratio to the third ratio, passage 368 becomes exhausted thereby exhausting passage 408 on the upstream side of the flow control orifice 410. Governor pressure acts on the left hand side of valve spool 402. The governor pressure is distributed to valve 400 through passage 412. If the forced downshift from the fourth ratio to the third ratio should occur at a speed less than a calibrated value, such as 50 miles per hour, the valve position for valve 400 is that which is shown in FIG. 2A. If this is the case, direct communication is established between passage 414 and passage 416, which communicates with passage 418 and passage 372 through 4-3 coast control valve 420. Thus, as the servo 362 is stroked to the release position, fluid is displaced through passages 372 and 418 and through the 4-3 coast valve 420 to passage 416. It then is transferred directly to passage 414 and through orifice 410 to the exhausted passage 368. If a corresponding shift should occur when the speed is above the predetermined limiting value, valve 400 will be stroked thereby directly connecting passage 408 and passage 414, the latter connecting passage 372 with exhausted passage 368 through valve chamber 404. Thus, the servo is stroked at a relatively fast rate since the displaced oil need not pass through orifice 410.

The 4-3 coast control valve also is sensitive to governor pressure which is distributed to it through passage 422. At speeds greater than a predetermined lower limiting value, valve 420 is stroked in a left hand direction against the opposing force valve spring 424.

If the servo 362 is to be conditioned for a downshift under coasting conditions and the speed is below the lower limiting value, passage 372 becomes connected directly to passage 408 on the upstream side of the orifice 410. Thus, the servo is stroked at a relatively fast rate. If a corresponding shift should occur when the vehicle speed is greater than a predetermined lower limiting value, valve 420 is stroked in a left hand direction and the connection between passages 372 and 408 is interrupted. At the same time a connection is established between passage 416 and passage 418. Thus, the fluid displaced from the release side of the servo must pass through passages 426 and 414 and then through orifice 410 before it reaches the exhausted passage 368. This retards the rate of application of the servo and cushions a downshift to the third speed ratio.

When the vehicle is coasting at a relatively slow speed while the transmission is in condition for four-speed ratio operation, it may be desirable to interrupt the fourth speed ratio driving condition to prevent engine lugging. This is accomplished by the 4-3 coast scheduling valve 426. This valve comprises a valve spool having lands 428 and 430 of differential diameter. The valve is urged normally in a right hand direction by valve spring 432. When the valve is positioned as shown, communication is established directly between governor pressure passage 386 and governor pressure passage 360. Feedback pressure passage 434 receives the modulated pressure, as does the passage 360. The valve 426 thus acts as a governor pressure reducer valve so that the governor pressure acting on the 3-4 shift valve spool 336 is of a lower magnitude than the governor pressure that acts on the other shift valves. This causes a downshift to occur at a higher road speed than that speed that otherwise would occur if the 3-4 shift valve were to be subjected to a full governor pressure.

Control pressure is distributed from the manual valve through passage 332, which communicates with passage 356 through two-way check valve 436. If a forced downshift should occur by actuating the throttle downshift valve, pressure is distributed to passage 438 which communicates with passage 356 through the check valve 436. Except for these forced downshift conditions, passage 438 is exhausted and the check valve blocks passage 438 from passage 332.

Having thus described a preferred form of our invention, what we claim and desire to secure by U.S. Letters Patent is:

1. A multiple ratio power transmission mechanism comprising three sets of planetary gear elements each having a ring gear, a sun gear, a carrier and planet pinions mounted on said carrier in meshing engagement with the sun and ring gears, a transmission housing having two housing portions, a first of said gear units being situated in one housing portion and the second and third of said gear units being situated in the other housing portion, said gear units being axially aligned, a power input shaft journalled with one end thereof within said one housing portion, a power output shaft journalled with one end thereof in said other housing portion, an intermediate shaft situated between said input shaft and said output shaft in coaxial alignment, first brake means in said one housing portion for anchoring the reaction element of said first gear unit, first clutch means in said one housing portion for locking together elements of said first gear unit, a torque output element of said first gear unit being connected directly to one end of said intermediate shaft, the sun gears of said second and third gear units being connected together, the carrier of said second gear unit and the ring gear of said third gear unit being connected to said output shaft, second clutch means in said other housing portion for connecting selectively said intermediate shaft to the sun gears for said second and third gear units, second brake means for anchoring the sun gears of said second gear units during second speed ratio operation, third clutch means for connecting selectively said intermediate shaft to the ring gear of said second gear unit during operation of said mechanism in each forward driving speed ratio, brake means for anchoring the carrier of said third gear unit during operation in a first forward driving speed ratio, said first brake means being applied to provide torque multiplication in said first gear unit during operation of said mechanism in each forward driving underdrive ratio, said first brake means comprising a brake drum connected mechanically to the sun gear of said first gear unit, said brake drum being journalled on said one housing portion, friction means for selectively anchoring said brake drum, a fluid pressure operated brake servo for actuating and releasing said friction means comprising a piston and a cooperating cylinder defining two fluid pressure chambers on either side of said piston, said piston frictionally engaging said friction means when it is stroked in one direction and to release said friction means when it is stroked in the opposite direction, fluid pressure operated servos for engaging and releasing each of said other clutches and each of said other brakes, a control circuit pressure source, conduits connecting said pressure source with said fluid pressure operated servos including separate conduits extending to each pressure chamber of the servo for said first gear unit, a pressure distributor valve means situated in and partly defining said conduit structure for controlling selectively the distribution of pressure to the release side of said last named servo as ratio changes are accomplished between a third speed ratio and the direct drive ratio, manual valve means situated between said pressure source and said pressure distributor valve means for controlling distribution of pressure to the latter, a source of a governor pressure signal that is proportional in magnitude to the driven speed of said power output shaft, flow control orifice means communicating with the release side of said servo for said first gear unit through which fluid displaced from said release side is passed during the ratio changes from the direct drive ratio to the third speed ratio, first timing valve means communicating with the release side of said servo for said first gear unit for bypassing at least a portion of the displaced fluid around said flow control orifice means when the governor pressure is less than a first limiting value, and second timing valve means communicating with said release side for bypassing at least a portion of the displaced fluid around said orifice means when governor pressure is greater than a second limiting value, each timing valve means communicating with said governor pressure source.

2. The combination set forth in claim 1 wherein said distributor valve means includes a control pressure land thereon, a passage connecting said manual valve with said control area, said manual valve pressurizing said last-named passage and said control area when it is moved to one operating position thereby hydraulically locking said distributor valve means in a low speed ratio position thus overruling the normal valve shifting tendencies thereof, said manual valve means, upon assuming a second position, distributing control circuit pressure to said distributor valve means to condition said mechanism for automatic ratio changes between said direct drive ratio and said third speed ratio.

3. The combination set forth in claim 1 wherein the communication between said distributor valve means and said governor pressure source includes a coast scheduling valve means for modulating the governor pressure signal distributed to said distributor valve means whereby the normal upshifting tendency imposed on said distributor valve means is interrupted when the governor pressure is reduced below a calibrated value.

4. The combination set forth in claim 1 wherein the communication between said distributor valve means and said governor pressure source includes a coast scheduling valve means for modulating the governor pressure signal distributed to said distributor valve means whereby the normal upshifting tendency imposed on said distributor valve means is interrupted when the governor pressure is reduced below a calibrated value.

* * * * *

UNITED STATES PATENT OFFICE
CERTIFICATE OF CORRECTION

Patent No. 3,706,240   Dated December 19, 1972

Inventor(s)   Karl J. Borneman et al

It is certified that error appears in the above-identified patent and that said Letters Patent are hereby corrected as shown below:

Column 15, line 47, cancel "to release" and substitute --releasing--.

Signed and sealed this 16th day of July 1974.

(SEAL)
Attest:

McCOY M. GIBSON, JR.
Attesting Officer

C. MARSHALL DANN
Commissioner of Patents